P. CARLSON.
COTTON CHOPPER.
APPLICATION FILED JUNE 16, 1910.
1,005,691.
Patented Oct. 10, 1911.
2 SHEETS—SHEET 1.
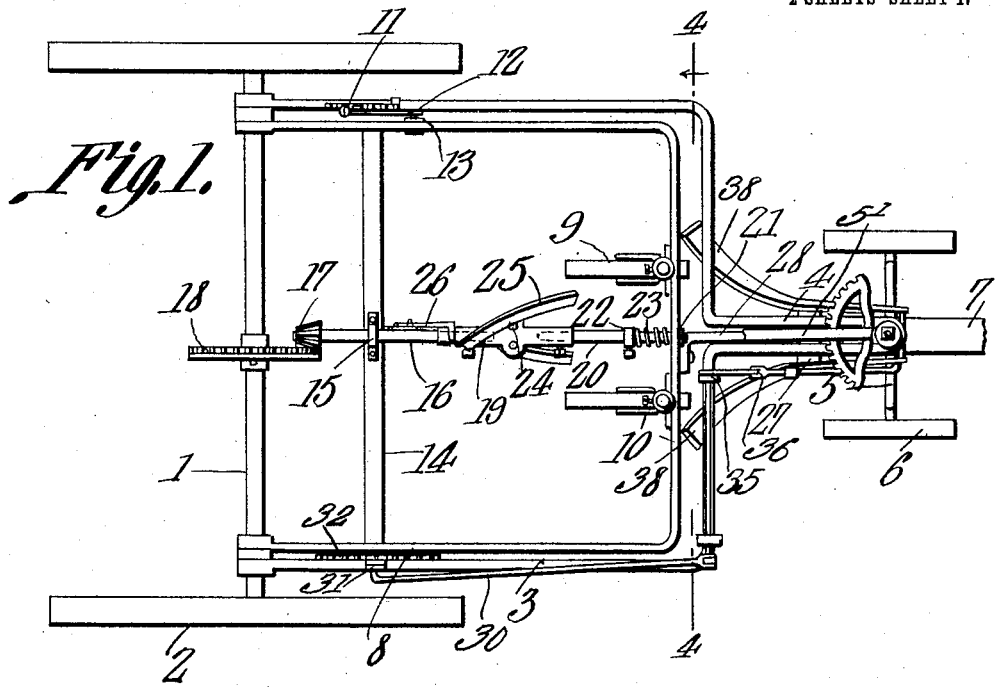
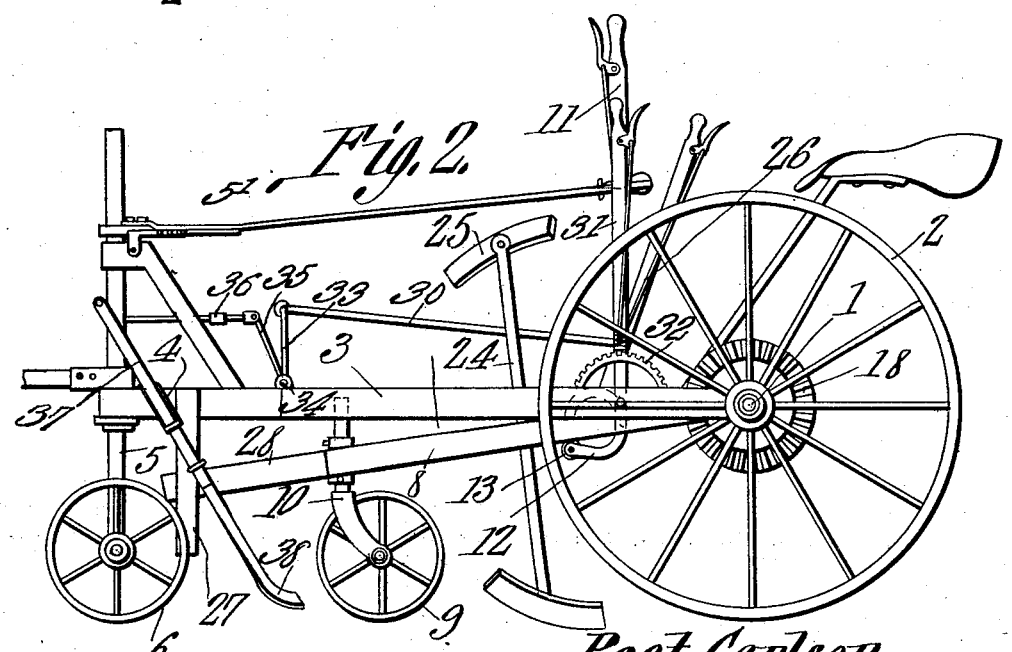
Witnesses
Peet Carlson,
Inventor
by C. A. Snow & Co.
Attorneys

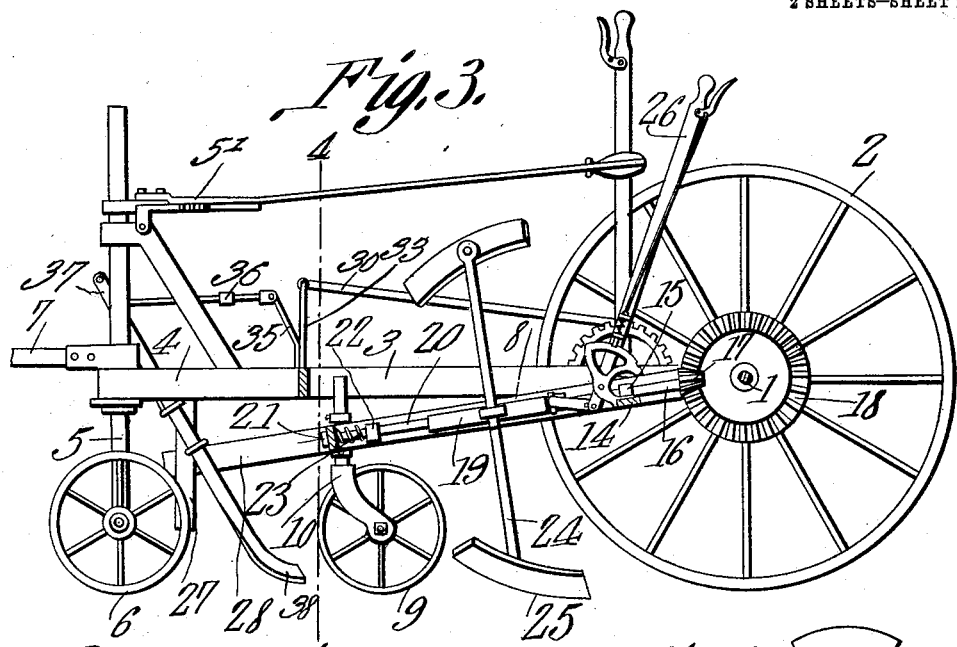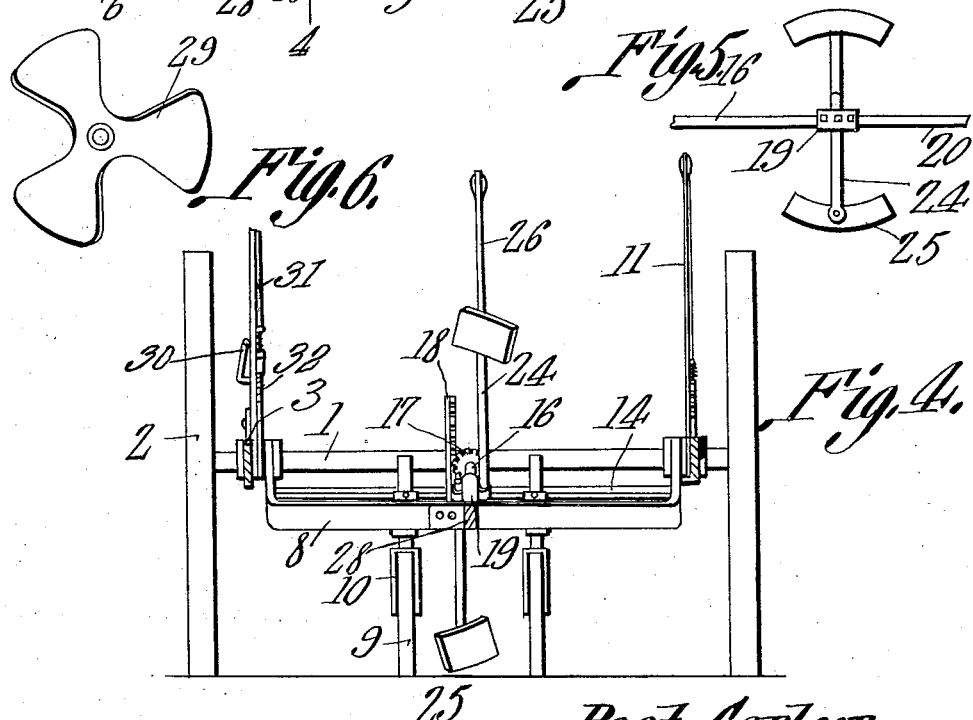

1,005,691. COTTON-CHOPPER. PEET CARLSON, Carlson, Tex. Filed June 16, 1910. Serial No. 567,282.

*To all whom it may concern:*

Be it known that I, PEET CARLSON, a citizen of the United States, residing at Carlson, in the county of Travis and State of Texas, have invented a new and useful Cotton-Chopper, of which the following is a specification.

This invention relates to a cotton chopper and consists in the novel construction and arrangement of its parts as hereinafter described and shown.

The object of the invention is to provide a chopper of the character indicated as a simple and durable structure consisting of a wheel supported frame to the axle of which is pivotally attached a supplemental frame which in turn is supported at its forward edge portion upon caster wheels. A hoe shaft is carried by the supplemental frame and chopping hoes or a chopping blade may be mounted upon the said shaft, means being provided for raising and lowering the supplemental frame and for guiding its adjustment and bracing it against lateral strain with relation to the primary frame and means also being provided for throwing the hoe shaft in or out of gear with the supporting axle of the main frame.

In the accompanying drawings: Figure 1 is a top plan view of the cotton chopper. Fig. 2 is a side elevation of the same. Fig. 3 is a longitudinal sectional view of the same. Fig. 4 is a transverse sectional view of the same cut on the line 4—4 of Fig. 1. Fig. 5 is a detail side view of chopping hoes mounted upon the hoe shaft. Fig. 6 is a side elevation of a chopping blade adapted to be mounted upon the hoe shaft.

The cotton chopper consists of an axle 1 mounted at its ends upon traction wheels 2 and having a main or primary frame 3 pivotally mounted at its rear portions thereon. The frame 3 is made substantially in the form of a yoke. The frame 3 is provided at its forward edge and at a point intermediate its side edges with a forward projection 4 which is mounted upon a truck 5 having ground wheels 6. A lever mechanism 5' is provided for turning and holding the truck 5 with relation to the frame 3. A draft tongue 7 or other draft means is suitably connected with the said truck.

A supplemental frame 8 is pivoted at its rear portions to the axle 1 between the side parts of the frame 3 and the forward portion of the supplemental frame 8 is supported by caster wheels 9. The frames 10 of the said caster wheels may be adjusted vertically with relation to the supplemental frame 8 whereby the forward portions thereof may be caused to travel comparatively close or distant from the surface of the ground. A lever 11 is fulcrumed upon the frame 3 and is provided with an angularly disposed working end 12 upon which is journaled a roller 13 which lies under the edge of one of the side portions of the supplemental frame 8. By swinging the lever 11 it will be seen that the forward edge portion of the frame may be raised or lowered with relation to the frame 3.

The frame 8 is provided with a cross bar 14 which in turn is provided with a bearing 15. A shaft section 16 is journaled in the bearing 15 and is provided at its rear end with a beveled pinion 17 which meshes with a bevel gear wheel 18 mounted upon the intermediate portion of the axle 1. The forward end of the shaft 16 is adjustably secured in a sleeve 19 and the rear end of a shaft section 20 is similarly secured in the forward end of the said sleeve. The forward end of the shaft section 20 is journaled in the forward portion of the frame 8. A nut or stop 21 is mounted upon the forward end of the shaft section 20 and is located normally against the forward side of the front edge of the frame 8. A collar 22 is adjustably mounted upon the intermediate portion of the shaft section 20 and a coil spring 23 is interposed between the said collar and the rear surface of the forward edge portion of the frame 8. The spring 23 is under tension with a tendency to hold the shaft sections 16 and 20 together with the sleeve 19 in rearward position whereby the beveled pinion 17 will be held in mesh with the beveled gear wheel 18. Arms 24 are adjustably mounted in the sleeve 19 and at their outer ends carrying chopping blades 25. A lever 26 is fulcrumed upon the cross bar 14 of the frame 8 and operatively engages the shaft section 16 so that when the said lever 26 is swung the said shaft 16 may be moved longitudinally, and through the sleeve 19 the shaft section 20 is moved against the tension of the coiled spring 23 and thus the beveled pinion 17 is moved out of engagement with the beveled gear wheel 18. Guides 27 are attached to the forward side portions of the extension 4 of the frame 8 and an arm 28 is fixed to the forward portion of the frame 8 and lies between the guides 27 but may move vertically.

The short lever 31 is pivoted to the frame 3 at the opposite side to the lever 11, and is provided with the rack 32, said lever having a link 30 extending forwardly thereof and connected to the crank arm 33, which operates the shaft 34 and also its crank arm 35, said crank arm 35 being adjustably connected through the adjustable link 36 to the upper end of the pivoted levers 37, which have mounted upon its lower ends the scrapers 38. By this means the manipulation of the lever 31 will regulate the movement of the scrapers 38 toward and from the ground.

As the machine is drawn along a row of plants and the beveled pinion 17 is in mesh with the beveled gear wheel 18; rotary movement is transmitted from the axle 1 to the shaft sections 16 and 20 and the sleeve 19. As the said sleeve rotates upon its axis the hoe blades 25 are carried around and chop out the excessive plants in the row. However should the chopping blade 29 be applied to the shaft sections 16 and 20 the excessive plants will be removed from the row in a similar manner. Inasmuch as the forward portion of the arm 28 is located between the guides 27 and may move vertically the frame 8 is braced against lateral movement during the plant chopping operation.

Having described the invention what I claim as new and desire to secure by Letters Patent is:

A cotton chopper comprising a wheel mounted axle, a primary frame pivoted at its rear end upon the axle and having at the intermediate part of its forward edge a forwardly projecting portion, a wheel mounted truck supporting the forwardly projecting portion of said frame, a secondary frame also pivoted upon the axle and lying within the first said frame, a shaft journaled upon the secondary frame, means operatively connecting said shaft with the axle, hoe blades carried by the shaft, vertically disposed parallel guides depending from the forwardly projecting portion of the primary frame, an arm mounted upon the secondary frame and received between the guides for free vertical play, and a supporting caster wheel attached to the forward portion of the secondary frame.

In testimony that I claim the foregoing as my own, I have hereto affixed my signature in the presence of two witnesses.

PEET CARLSON.

Witnesses:
W. C. KEEBLE,
WALTER KEEBLE.